United States Patent [19]

Plonk

[11] Patent Number: 5,186,375
[45] Date of Patent: Feb. 16, 1993

[54] BODY SUPPORTED HOLDER FOR ELECTRONIC DEVICES

[76] Inventor: Byron J. Plonk, 32 Kingswharf Pl., Waldorf, Md. 20602

[21] Appl. No.: 693,587

[22] Filed: Apr. 30, 1991

[51] Int. Cl.$^5$ .......................... A45F 3/02; A47B 23/00
[52] U.S. Cl. ........................ 224/202; 108/43; 248/444; 206/305; 224/242; 224/249; 224/270
[58] Field of Search ............. 224/202, 203, 205, 207, 224/270, 242, 245, 247, 249; 108/43; 248/444; 206/576, 305, 373, 569

[56] References Cited

U.S. PATENT DOCUMENTS

| | | | |
|---|---|---|---|
| 2,338,816 | 1/1944 | Lockhart | 108/43 |
| 2,590,732 | 3/1952 | Simancik | 108/43 |
| 2,861,854 | 11/1958 | Best | 224/270 |
| 2,979,990 | 4/1961 | Alexander | 108/43 |
| 3,541,976 | 11/1970 | Rozas | 108/43 |
| 4,103,809 | 8/1978 | Frost et al. | 108/43 |
| 4,248,368 | 2/1981 | Lindsay | 224/249 |
| 4,790,041 | 12/1988 | Shtull | 108/43 |
| 4,795,210 | 1/1989 | Milat | 108/43 |
| 5,038,688 | 8/1991 | Permenter | 248/444 |
| 5,058,736 | 10/1991 | Bedol | 206/576 |

FOREIGN PATENT DOCUMENTS 424589  5/1911  France ................. 224/270

Primary Examiner—Ernest G. Cusick
Assistant Examiner—Keith Kupferschmid
Attorney, Agent, or Firm—Richard C. Litman

[57] ABSTRACT

A body supported combination holder and writing surface for use with hand held computers used in the field of utility meter reading provides for the retention of such a computer within a channel of the holder. The computer is retained within the channel by channel extensions which extend slightly over the edges of the computer, and by retaining clips within the bottom of the channel. The keyboard of the computer is fully accessible through the open upper side of the channel, and the writing surface is essentially coplanar with the keyboard of the computer when such a computer is installed within the holder. The membrane keyboard typical of such computers permits the writing surface to extend across the relatively narrow face of the computer in order to provide a larger writing surface area. The holder may be supported by retaining pins inserted within holes provided in the device, or in an alternate version by an extension insertable within the trouser waistband of the user, thus leaving both of the user's hands free. One or more storage compartments may be included by enclosing the space immediately below the writing surface. Relatively minor modifications of the holder permit its use with a variety of similarly configured electronic devices.

11 Claims, 2 Drawing Sheets

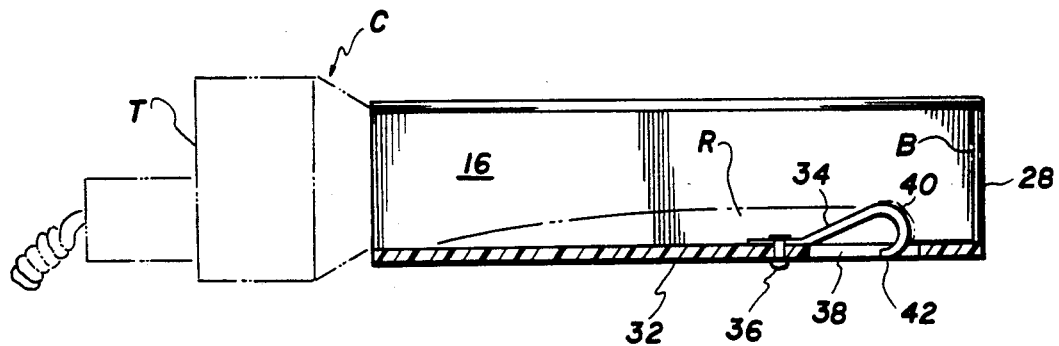
FIG. 2
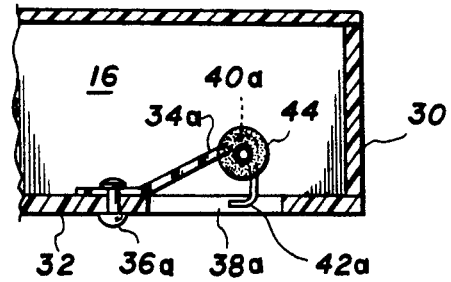
FIG. 2A
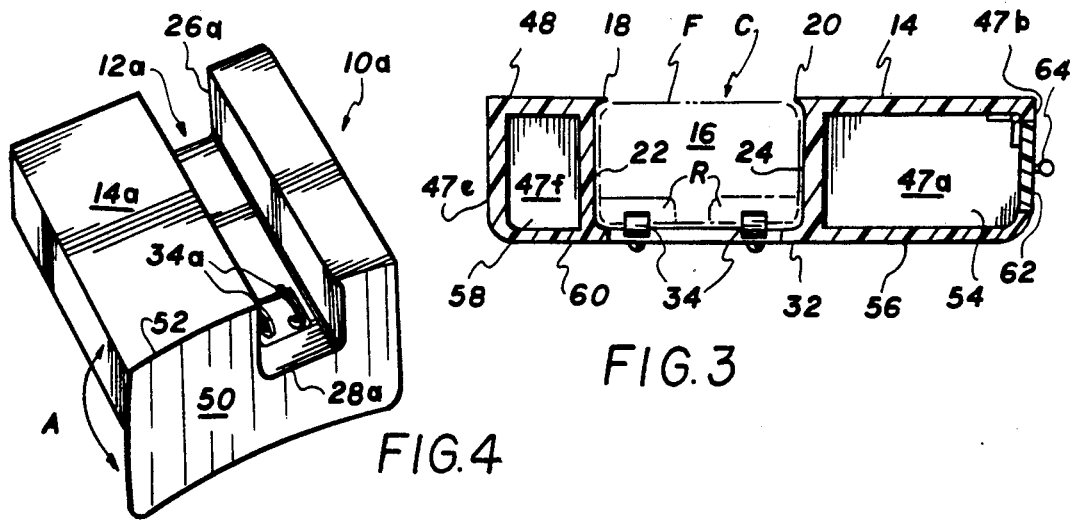
FIG. 4
FIG. 3

BODY SUPPORTED HOLDER FOR ELECTRONIC DEVICES

FIELD OF THE INVENTION

This invention relates generally to accessories for use with hand held computers and the like, and more specifically to a device which may be supported by the body and which provides not only a holder for a hand held computer or similar article, but also an adjacent flat surface for use in writing or other activities and a storage area immediately below the writing surface.

BACKGROUND OF THE INVENTION

With the advent of miniaturized electronics, the use of hand held computers and other such miniaturized electronic devices such as portable radio transceivers, has become widespread. One example of such use is in the field of recording readings from utility meters.

In the past, meter readers manually recorded the readings from each utility meter (gas, water, electric, etc.) on a card or form for later entry at a central office for customer billing at a later date. More recently, computers have been developed which are capable of storing on the order of a thousand meter entries, complete with customer addresses and/or other information. While this has simplified the job of the meter reader considerably, there are still frequent occasions in which it is necessary to enter data by hand on a card, such as when it is not possible to access a given meter for some reason or another, so the card may be completed by the customer.

The first generation of such computers for recording meter readings was sufficiently large that it also served as a convenient writing surface for such manual entries. (Typically, such computers are provided with a membrane type keyboard, over which it is possible to write on card stock type material without making accidental entries on the computer.) In fact, such computers were provided with attachment means for a strap or straps so the computer could be supported more or less horizontally from around the neck and/or shoulders of the user.

Recently, however, such computers have been further miniaturized to the point that they now measure only approximately four inches or less in width. No attachment points are provided for the attachment of any support means, other than a small strap which may be secured around the hand of the user. This results in a very cumbersome operation, particularly when the user must search for a particular key for access to an inside meter, fill out a card or other form, etc.

The need arises for a computer holder device in which such a computer may be held or stored, and which in turn may be supported from the user's body by straps or other means, thus leaving both of the user's hands free. The holder should also provide a sufficiently large surface in combination with the surface of the computer, to allow for use as a writing surface. Storage space for postcards, writing implements, etc. should be provided for greater utility. Finally, the holder must provide clear access to the keyboard of the computer for data entry, While at the same time securely holding the computer in place.

DESCRIPTION OF THE RELATED ART

Delaney U.S. Pat. No. 2,881,009 discloses a writing board which provides for the attachment of two stop watches, and means for operating the stop watches. The attachment means extends from one corner of the board rather than integrating the attachment feature with the flat surface of the board, and further does not appear to specifically provide for coplanar attachment with the board. No means for support by the body is disclosed, nor is any storage means provided.

Rozas U. S. Pat. No. 3,541,976 discloses a body supported desk. This device provides for several degrees of adjustment, and is thus relatively mechanically complex in comparison to the present invention. Moreover, no means is provided either for storage of small articles or for the holding or securing of any hand held device such as a computer, portable radio transceiver, etc.

Braver U.S. Pat. No. 4,320,838 discloses a tray for use in restaurants and the like, which provides a space for a check, bill or currency as well as a separate area containing a small calculator. The calculator is permanently affixed in its space in the tray by means of screws, rather than being quickly and easily removable as in the present invention. Moreover, even should the computer provide a flat surface, the remainder of the tray surface is of a curvilinear nature, which precludes use as a convenient writing surface. Further, no storage or bodily support means is disclosed.

Lin U.S. Pat. No. 4,478,330 discloses a container providing storage for a variety of different articles. The device is more in the nature of a case, in that the various electronic devices contained therein are permanently installed. No bodily support means is disclosed.

Gerver U.S. Pat. No. 4,832,191 discloses a sleeve installable over a book cover, which sleeve also provides for the holding of a typically hand held calculator. The device does not provide a writing surface coplanar with the calculator, nor is any bodily support or storage means disclosed.

None of the above noted patents, either singly or in combination, are seen to disclose the specific arrangement of concepts disclosed by the present invention.

SUMMARY OF THE INVENTION

By the present invention, an improved holder for use with hand held computers or other electronic devices is disclosed.

Accordingly, one of the objects of the present invention is to provide an improved holder for such hand held electronic devices which may be supported by the body of the user, thus leaving the user's hands free for other purposes.

Another of the objects of the present invention is to provide an improved holder for such electronic devices which may also provide a flat surface which may be used as a writing surface.

A further object of the present invention is to provide an improved holder for such electronic devices which provides complete access to the keyboard of such an electronic device.

An additional object of the present invention is to provide an improved holder in which the flat writing surface and the front surface of any electronic device stored therein are essentially coplanar.

Yet another object of the present invention is to provide an improved holder for such electronic devices which also provides for retaining means for any electronic device held therein.

Still another object of the present invention is to provide an improved holder for such electronic devices which also provides accessible storage means for small articles, such as notebooks, postcards, and writing implements.

Another object of the present invention is to provide an improved holder which is of essentially monolithic construction.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 2A is a cross sectional view along line 2—2 of FIG. 1, showing the retaining means for an electronic device which may be held therein.

FIG. 2B is a cross sectional view, partially broken away, along line 2—2 of FIG. 1 showing an alternative retaining means.

FIG. 3 is a cross sectional view along line 3—3 of FIG. 1 showing further retaining means at the upper edges of the channel and the interior of the storage compartment.

FIG. 4 is a perspective view of an alternate embodiment, showing an alternative bodily support means.

Similar reference characters designate corresponding parts throughout the several figures of the drawings.

DESCRIPTION OF THE PREFERRED EMBODIMENT

Figure 1:
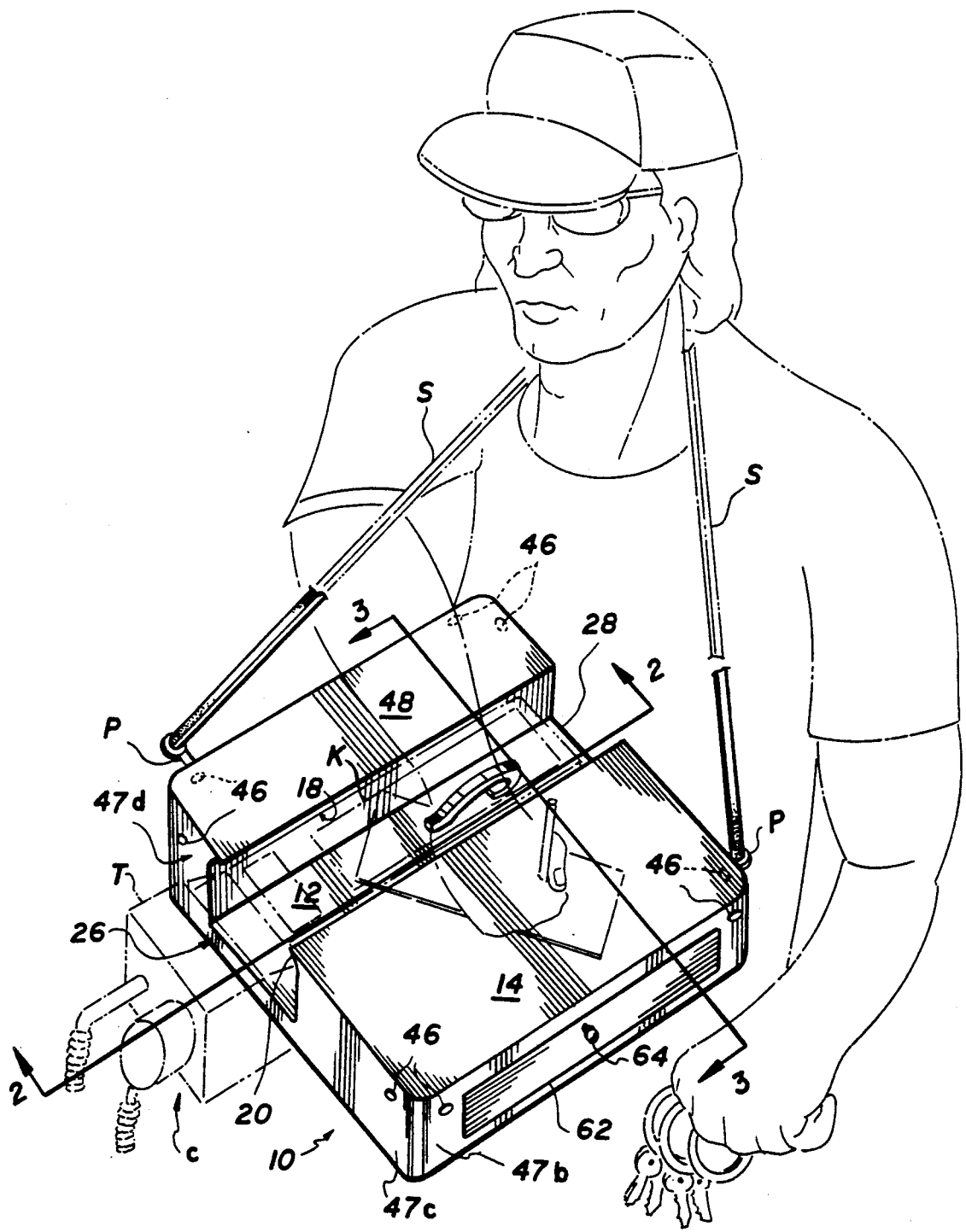
FIG. 1 is a perspective view of the holder in use, showing one type of bodily support means.

Referring now to the drawings, particularly FIG. 1 of the drawings, the present invention will be seen to relate to a holder 10 for use with a hand held computer or similarly configured electronic device. Such computers or electronic devices, generally designated as C throughout the drawings, are commonly used in the field of utility meter reading for the entry and storage of meter readouts and other information. Obviously, other types of hand held electronic or other devices having the same general configuration as the above computer C may be used in combination with the present invention 10.

Holder 10 comprises two basic components: A channel 12 for the holding of computer C, and a flat surface 14 which is formed so as to be essentially coplanar with the face F of computer C as it is held in position within holder 10, as may be more clearly show in FIG. 3 of the drawings. It is to be understood that holder 10 may be formed as a single monolithic unit if desired, or alternatively may be assembled from various component subassemblies. Channel 12 is formed so that its interior 16 will closely fit the exterior shape of computer C. The precise dimensions of the channel interior 16 may of course be varied in order to properly hold various types of computers C which may be carried therein. The vital features of channel 12 are the two retaining means included therein for the retention of computer C, and the immediately adjacent flat surface 14 formed so as to be essentially coplanar with the top surface F of any computer C retained within channel 12.

The retaining means noted above are comprised of two different basic forms. Channel 12 is more properly considered a channel, rather than a sleeve, due to the need for access to the keyboard K typically located on the face F of a computer C held therein. However, an open channel would allow computer C to pass through the open top of the channel, thus failing to retain computer C within the holder 10. In order to eliminate this problem, extensions 18 and 20 extend inward from the walls 22 and 24 of channel 12, providing a dimension between extensions 18 and 20 which is slightly narrower than that of computer C. Thus, computer C may only be inserted or withdrawn from the forward end 26 of channel 12, rather than from the opening between extensions 18 and 20 Computer C is prevented from passing through the rearward end 28 of channel 12, due to the relatively large size of the top T of computer C and its interference with the forward end 26 of channel 12. Alternatively, a base cap 30, as shown in FIG. 2B, could be formed at the rearward end 28 of channel 12 to prevent any device inserted within channel 12 from passing completely through.

Further retaining means are required in order to prevent computer C from falling from the forward end 26 of channel 12, in the event holder 10 is tilted forward. The typical computer C used in the utility meter reading field contains two laterally spaced apart recesses R which extend along the lower portion of each side of the device. These recesses R do not extend to the extreme end of the computer C but terminate somewhat above this point, thus providing a full width base B for computer C.

The general shape of such a computer C as described above thus provides for retaining means in the floor 32 of channel 12 which extend into recesses R of computer C, as shown in FIGS. 2A and 2B. FIG. 2A discloses one type of retaining means, comprising a spring clip 34 which is normally biased to extend upward into channel 12 and closely fit within recess R of computer C. Spring clip 34 is secured to channel floor 32 by means of a rivet 36 or other fastening means, or alternatively may be formed integrally with holder 10, and extends upward at an angle to the floor 32 of channel 12. Thus when a computer C is inserted within channel 12, clip 34 will be pushed clear of channel 12 through opening 38 in channel floor 12 as computer base B contacts the angled portion of clip 34, and clip 34 will spring back into position within recess R of computer C to firmly retain computer C within channel 12 of holder 10. It will be seen that clip 34 is provided with a radiused portion 40 which is formed to closely conform with the shape of the recess R of computer C.

When computer C is to be removed from holder 10, the user of holder 10 may withdraw clip 34 from its normally biased position within channel 12 and recess R of computer C by pulling finger latch 42 outward. This will cause spring clip 34 to be withdrawn through the floor 32 of channel 12, thus allowing the base portion B of computer C to be drawn past clip 34 and computer C to be removed from channel 12 of holder 10.

FIG. 2B shows an alternate method of accomplishing the same retention function as that shown in FIG. 2A. In FIG. 2B, a roller 44 is provided in the radius area 40a of spring clip 34a in order to further reduce friction as a computer C is inserted or withdrawn from channel 12. Other aspects of the spring clip 34a shown in FIG. 2B are essentially the same as those shown in FIG. 2A. As noted above, a computer C may contain two spaced apart recesses R; thus, two clips 34 or 34a are preferably provided in the floor 32 of channel 12 in order to more securely retain computer 12 within holder 10.

Means for supporting holder 10 from the body of a user are provided by passages 46 which are located near the upper corners of sidewalls 47a through 47g of holder 10. Many of the older computers used in the utility meter reading field were capable of being secured to a user by means of a strap S and quick release pins P, which pins P were inserted into holes integral with the computer itself. Newer computers such as the example C used throughout this specification are not equipped with such means for the retention of pins P. Holder 10 provides for the use of straps S and pins P in combination with holder 10, by means of passages 46 described above. Passages 46 may be positioned at any suitable location on holder 10, but are preferably placed in pairs near each of the upper corners of sidewalls 47a through 47f.

An alternative method of supporting such a holder 10 from the body of a user is shown in FIG. 4. In this embodiment the holder, designated as 10a, may be seen to have a plate 50 depending from the rear edge 52 of surface 14a and the rearward end 28a of channel 12a. Plate 50 will be seen to be formed in a curve, in order to more accurately conform to the body of a user, and will preferably form an angle A somewhat more than 90 degrees with surface 14a of holder 10a. Plate 50 may be inserted within the waistband of the trousers of a user to provide for the support of holder 10a as an alternative to the system of straps D and pins P used with holder 10.

Holder 10 may also provide a compartment 54 for the internal storage of various articles by enclosing the space between surface 14, sidewalls 47a through 47c, and channel wall 24 with a floor 56; this may be more clearly seen in FIG. 3 of the drawings. In addition, a second storage compartment 58 may be provided by similarly enclosing the space between sidewalls 47d through 47f, channel wall 22, and flange 48 with a floor 60, although the space provided within second compartment 58 will be relatively small. A door 62 is located within sidewall 47b to provide access means to compartment 54; a release handle 64 or other means may be provided on door 62. A similar door or access means, not shown, may obviously be installed to provide access to second compartment 60 if desired.

A person using holder 10 or 10a may insert a computer C within channel 12 or 12a until computer base B passes over spring clips 34 or 34a, and clips 34 or 34a spring back to their biased position within channel 12 or 12a and recesses R of computer C. Computer C will thus be securely retained within channel 12 or 12a of holder 10 or 10a. Pins P, secured to the opposite ends of a strap S, may then be inserted within passages 46 of holder 10, or plate 50 of holder 10a may be inserted within the user's waistband, thus providing hands free support for holder 10 or 10a and any computer C which may be carried therein. The user of such a holder 10 or 10a may then handle keys or other articles, write or record readings or other notes on the keyboard K of computer C or alternatively fill out cards, forms or other paperwork, etc., due to the hands free convenience provided by holder 10 or 10a. The provision for a flat surface 14 or 14a which is essentially coplanar with the face F of a computer C, provides for a continual surface which may be used for such filling out of cards, forms or the like. The position of a strap S may be adjusted in order to angle holder 10 as desired to provide a convenient writing surface, or holder 10 may be quickly and easily swung to the side as desired. The embodiment of holder 10a also provides a convenient surface which is angled toward the user due to the obtuse angle A between plate 50 and surface 14a.

When computer C must be removed from holder 10 or 10a, as might be the case for the electronic entry or retrieval of data therefrom, spring clips 34 may be withdrawn from their normally biased position within channel 12 or 12a where they serve to retain computer C within the channel of holder 10 or 10a, by drawing latches 42 downward from openings 38 in the floor of channel 12 or 12a. Computer C may then be withdrawn by sliding it outward through channel 12 or 12a, and out through the forward end 26 or 26a of channel 12 or 12a. Holder 10 may be removed by withdrawing one or more of the quick release pins P attaching strap S to holder 10, or by merely slipping strap S over the head of the user. Alternatively, holder 10a may be removed by merely lifting upward to withdraw plate 50 from the trouser waistband of the user.

Obviously, there are many shapes and sizes of electronic devices which would benefit from the advantages provided by such a holder 10 or 10a. It will be obvious to those skilled in the art that the retaining means described herein may be modified as necessary to retain electronic devices other than the specific type of computer described herein. It is to be understood that the present invention is not limited to the sole embodiment described above, but encompasses any and all embodiments within the scope of the following claims.

I claim:

1. A holder supported by the body of the user of said holder for a hand held computer or electronic device comprising;
    means defining a channel for the containment of said electronic device,
    said channel means having a forward and a rearward end,
    said channel means defined by first and second spaced apart opposite walls with a floor extending therebetween and thereby defining a channel interior,
    said first and second opposite channel walls each having an upper and a lower edge,
    said channel interior formed so as to closely fit said electronic device contained therein,
    said electronic device having exterior surfaces adapted to be conformed to said channel interior and an additional upper face extending between said first channel wall upper edge and said second channel wall upper edge when said electronic device is contained within said channel,
    a planar surface extending outward from said first channel wall upper edge,
    said planar surface having a periphery including a forward and a rearward edge conterminous with said channel forward and rearward ends,
    a flange extending outward from said second wall upper edge,
    said flange having a periphery including a forward and a rearward edge conterminous with said channel forward and rearward ends,
    a plurality of side walls depending from said peripheries of said planar surface and said flange,
    means providing support for said holder by said body of said user, and
    upper and lower retaining means for said electronic device with said lower retaining means provided within said floor of said channel,
    said support means comprise passages in said sidewalls for the removable insertion of releasable pins with said pins having at least one strap extending therebetween, whereby said electronic device is insertable within said channel and securely retainable therein and said strap is placed around said body of said user and said pins are inserted in said passages to provide said support.

2. The holder of claim 1 wherein;
said planar surface is coplanar with said upper face of said electronic device inserted in said channel.

3. The holder of claim 1 wherein;
said holder is of monolithic construction.

4. The holder of claim 1 including;
a base cap within said rearward channel end,
said base cap extending between said first and second channel walls.

5. The holder of claim 1 wherein;
said upper retaining means comprise extensions inward from said first and second opposite wall upper edges, whereby
said electronic device is retained within said channel between said first and second opposite walls by said extensions.

6. The holder of claim 1 wherein;
said lower retaining means comprise one or more releasable retaining clips within said channel floor,
said clips biased upward within said channel, whereby
said electronic device is releasably retained within said channel by said clips.

7. The holder of claim 1 including;
a first compartment floor extending from said first channel wall lower edge to said sidewalls depending from said planar surface,
thereby providing a first storage compartment defined by said planar surface, said first compartment floor, said first channel wall, and said sidewalls depending from said planar surface.

8. The holder of claim 7 including;
access means for said first storage compartment.

9. The holder of claim 8 wherein;
said access means for said storage compartment comprises a door,
said door located within one of said sidewalls.

10. The holder of claim 1 including;
a second compartment floor extending from said second channel wall lower edge to said sidewalls depending from said flange,
thereby providing a second storage compartment defined by said flange, said second compartment floor, said second channel wall, and said sidewalls depending from said flange.

11. A holder supported by the body of a user of said holder for a hand held computer or electronic device comprising;
means defining a channel for the containment of said electronic device,
said channel means having a forward and a rearward end,
said channel means defined by first and second spaced apart opposite walls with a floor extending therebetween and thereby defining a channel interior,
said first and second opposite channel walls each having an upper and a lower edge,
said channel interior formed so as to closely fit said electronic device contained therein,
said electronic device having exterior surfaces adapted to be conformed to said channel interior and an additional upper face extending between said first channel wall upper edge and said second channel wall upper edge when said electronic device is contained within said channel,
a planar surface extending outward from said first channel wall upper edge,
said planar surface having a periphery including a forward and a rearward edge conterminous with said channel forward and rearward ends,
a flange extending outward from said second wall upper edge,
said flange having a periphery including a forward and a rearward edge conterminous with said channel forward and rearward ends,
a plurality of side walls depending from said peripheries of said planar surface and said flange,
means providing support for said holder by said body of said user, and
upper and lower retaining means for said electronic device with said lower retaining means provided within said floor of said channel,
said lower retaining means comprising one or more releasable retaining clips within said channel floor,
said releasable retaining clips containing rollers biased upward within said channel, whereby
said electronic device is insertable within said channel and securely retainable therein and said device is supported by said body of said user.

* * * * *